(12) United States Patent
Taka et al.

(10) Patent No.: US 8,567,286 B2
(45) Date of Patent: Oct. 29, 2013

(54) HYDRAULIC CONTROL DEVICE FOR AUTOMATIC TRANSMISSION

(75) Inventors: Shohei Taka, Wako (JP); Masayuki Sadakiyo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/577,800

(22) PCT Filed: Feb. 3, 2011

(86) PCT No.: PCT/JP2011/052280
§ 371 (c)(1),
(2), (4) Date: Aug. 8, 2012

(87) PCT Pub. No.: WO2011/099420
PCT Pub. Date: Aug. 18, 2011

(65) Prior Publication Data
US 2012/0298470 A1 Nov. 29, 2012

(30) Foreign Application Priority Data
Feb. 10, 2010 (JP) ................................. 2010-028274

(51) Int. Cl.
*F16H 47/00* (2006.01)
(52) U.S. Cl.
USPC .......................... 74/733.1; 74/731.1; 477/158
(58) Field of Classification Search
USPC ........ 74/730.1, 731.1, 732.1, 733.1; 477/156, 477/158
See application file for complete search history.

(56) References Cited

U.S. PATENT DOCUMENTS

| 5,833,565 | A | 11/1998 | Yasue et al. |
| 5,842,950 | A | 12/1998 | Tsutsui et al. |
| 6,739,998 | B2 * | 5/2004 | Iwata et al. ................... 475/127 |
| 7,175,556 | B2 * | 2/2007 | Morise et al. ................. 475/119 |
| 7,582,042 | B2 * | 9/2009 | Sato et al. ..................... 477/158 |

FOREIGN PATENT DOCUMENTS

| EP | 0 814 283 A2 | 12/1997 |
| JP | 9-317867 A | 12/1997 |
| JP | 10-9377 A | 1/1998 |
| JP | 2008-309217 A | 12/2008 |

* cited by examiner

*Primary Examiner* — Ha D Ho
(74) *Attorney, Agent, or Firm* — Arent Fox LLP

(57) ABSTRACT

At pre-shift of a shift control, a line pressure control section determines a pressure raising amount ΔPL of a line pressure PL on the basis of a pressure raising amount map stored in a memory, and controls a line pressure controlling linear solenoid valve so that the line pressure PL regulated by a regulator valve is raised by this pressure raising amount ΔPL. For example, a control hydraulic pressure corresponding to the pressure raising amount ΔPL is applied to the regulator valve from the line pressure controlling linear solenoid valve. Thus, hydraulic oil supplied from an oil pump is mostly discharged from an output port for the line pressure PL. Therefore, although there is a possibility that the line pressure PL regulated within a line pressure circuit somewhat varies when stroke of a hydraulic piston starts, a decrease of the line pressure PL is suppressed sufficiently compared with the case where the line pressure PL is not raised as a conventional manner.

5 Claims, 7 Drawing Sheets

HYDRAULIC CONTROL DEVICE FOR AUTOMATIC TRANSMISSION

TECHNICAL FIELD

The present invention relates to a hydraulic control device for an automatic transmission, which carries out a shift control to a target gear by switching a plurality of frictional engagement elements, and particularly, the present invention relates to a hydraulic control device for an automatic transmission, which controls a control hydraulic pressure when to switch the frictional engagement elements.

BACKGROUND ART

Heretofore, as a transmission for a vehicle (transmission), a so-called twin clutch transmission has been proposed and is in practical use (for example, see Patent Literature 1 mentioned below). In the twin clutch transmission (twin clutch transmission), a driving force transmission system is divided into two constituted from a combination of two clutches (frictional engagement elements) and a plurality of synchromesh mechanisms (selector devices), and any one of a plurality of gears is set up by switching these.

In such a twin clutch transmission provided with the synchromesh mechanisms, in order to select a predetermined gear, a shift fork of a corresponding synchromesh mechanism is operated by means of an actuator such as a hydraulic piston, and a dog (coupling sleeve) of this synchromesh mechanism is caused to move.

In the twin clutch transmission, a pre-shift control is carried out when to carry out a shift control from a predetermined gear to a target gear. In this pre-shift control, the shift fork is driven before an input shaft of the transmission is connected to a corresponding output shaft, and the predetermined gear is connected to the output shaft via the synchromesh mechanism.

Patent Literature 1 Japanese Patent Application Publication No. 2008-309217

SUMMARY OF THE INVENTION

Now, when the dog of the synchromesh mechanism is caused to move, in a hydraulic pressure control circuit of the transmission, a line pressure regulated by means of a regulator valve within a line pressure circuit is applied to a linear solenoid valve, and hydraulic oil with a control hydraulic pressure regulated using the linear solenoid valve is further supplied to a cylinder of the hydraulic piston. This causes the hydraulic piston to move in a desired direction, and the dog of the synchromesh mechanism connected to this hydraulic piston is caused to move.

However, in the hydraulic pressure control circuit that is configured so as to take a piston hydraulic pressure for controlling the hydraulic piston from the line pressure circuit that regulates the hydraulic oil to the line pressure, only the equivalent value of a leak rate of the hydraulic oil through a drain of each valve and the like is supplied to the line pressure circuit from the regulator valve when the line pressure circuit is in a static state. At this time, there has been a problem that the line pressure within the line pressure circuit decreases drastically just after this hydraulic piston starts to stroke.

Namely, a piston ring of the hydraulic piston starts to stroke, by which the control hydraulic pressure and the amount of hydraulic oil are consumed rapidly. A response of the regulator valve to regulate the line pressure within the line pressure circuit misses a rapid decrease of the line pressure due to this consumption, and this makes it impossible to maintain a target line pressure.

In the case where the line pressure within the line pressure circuit decreases in this manner, the line pressure (clutch control hydraulic pressure) as described above after the pre-shift control also decreased. There has been a problem that this causes the clutch to slip because the hydraulic pressure necessary for engagement of the clutch is not applied.

The present invention is made in view of the above points, and it is an object of the present invention to provide a hydraulic control device for an automatic transmission by which it is possible to effectively prevent defects such as a slippage of a clutch by raising a line pressure before a pre-shift control in which a synchromesh mechanism is operated in the automatic transmission such as a twin clutch transmission provided with a synchromesh mechanism.

In order to solve the problems described above, according to the present invention, there is provided a hydraulic control device (100, 200) for an automatic transmission (1), a plurality of frictional engagement elements (21, 22) being respectively provided so as to correspond to a plurality of driving force transmitting routes in the hydraulic control device, the hydraulic control device including a shift control section (100) that carries out a shift control by switching the plurality of frictional engagement elements (21, 22) after selection of a gear to be selected next (for example, a third gear) when to instruct gear shifting, the hydraulic control device including: a regulator valve (202) for regulating a line pressure (PL) from a hydraulic pressure applied from a hydraulic pressure supply source (201), the line pressure becoming a base oil pressure for operating the plurality of frictional engagement elements (21, 22); a linear solenoid valve (203) for regulating the line pressure (PL) regulated by the regulator valve (202) to a control hydraulic pressure in response to the shift control; an oil passage switching section (205, 103) for switching oil passages (226, 227) to which the control hydraulic pressure is applied from the linear solenoid valve (203) in order to switch gears among at least two gears (for example, a low gear and the third gear) including the gear to be selected (for example, the third gear); and a line pressure raising section (204, 102) for raising the line pressure (PL) regulated by the regulator valve (202) before switching into the gear to be selected (for example, the third gear).

According to the hydraulic control device for the automatic transmission of the present invention, when to carry out the shift control to switch from a current gear to the gear to be selected by switching oil passages by means of the oil passage switching section, it is possible to effectively prevent the line pressure from decreasing by raising the line pressure in advance in an early state of switching of the gears (for example, at the start of stroke of a hydraulic piston in the case where the hydraulic piston is used for the shift control the as an actuator).

In the hydraulic control device for the automatic transmission according to the present invention, it may be configured so that the line pressure raising section (204, 102) includes a line pressure controlling linear solenoid valve (204) that controls an amount of outputted oil from the regulator valve (202) in order to carry out a pressure raising control for the line pressure (PL). By using the linear solenoid valve in order to control the regulator valve in this manner, it is possible to linearly change the pressure raising amount of the line pressure (pressure raising control amount). Therefore, it is possible to appropriately raise the line pressure applied to the plurality of frictional engagement elements by means of a control of the automatic transmission that carries out the shift control n accordance with a driving state of a vehicle.

In the hydraulic control device for the automatic transmission according to the present invention, it is preferable that the hydraulic control device further includes a pressure raising amount storage section (101) for storing a pressure raising amount (ΔPL) of the pressure raising control for the line pressure (PL) in accordance with a setup condition of the shift control, wherein the pressure raising amount storage section (101) stores therein a pressure raising amount map based upon at least one of a time (t) required for switching into the gear to be selected and a required line pressure (PLt) for the frictional engagement element (21, 22) corresponding to the gear, and the line pressure raising section (102, 204) determines the pressure raising amount (ΔPL) of the line pressure (PL) on the basis of the pressure raising amount map stored in the pressure raising amount storage section (101). Thus, the pressure raising amount map indicating a relationship between a shift control condition obtained in advance by experiments or the like and a pressure raising amount is stored in the pressure raising amount storage section, and the line pressure raising section raises the line pressure on the basis of a shift control condition and the pressure raising amount map at a shift control. Therefore, it is possible to set up the pressure raising amount of the line pressure appropriately, and this makes it possible to effectively prevent the line pressure from decreasing at a pre-shift control of the shift control.

In the hydraulic control device for the automatic transmission according to the present invention, the line pressure raising section (102, 204) may reduce the raised line pressure (PLt+ΔPL) to the line pressure (PLt) before raising after the switching into the gear to be selected is completed. This makes it possible to prevent the line pressure from decreasing in an early state of the shift control while minimizing a raising time of the line pressure.

In this regard, reference numerals in parenthesis described above exemplify, for reference, corresponding components of an embodiment (will be described later). Further, a line pressure and the like in parenthesis described above exemplify ones corresponding to the embodiment (will be described later).

According to the present invention, in an automatic transmission such as a twin clutch transmission provided with a synchromesh mechanism, it is possible to effectively prevent a line pressure in an early state of a pre-shift control, in which a next gear is selected in advance, from decreasing by raising the line pressure so as to become higher than the line pressure required for a frictional engagement element at the pre-shift control.

DETAILED DESCRIPTION OF THE INVENTION

Hereinafter, a preferred embodiment of a hydraulic control device of an automatic transmission according to the present invention will be described in detail with reference to the appending drawings.

Figure 1:
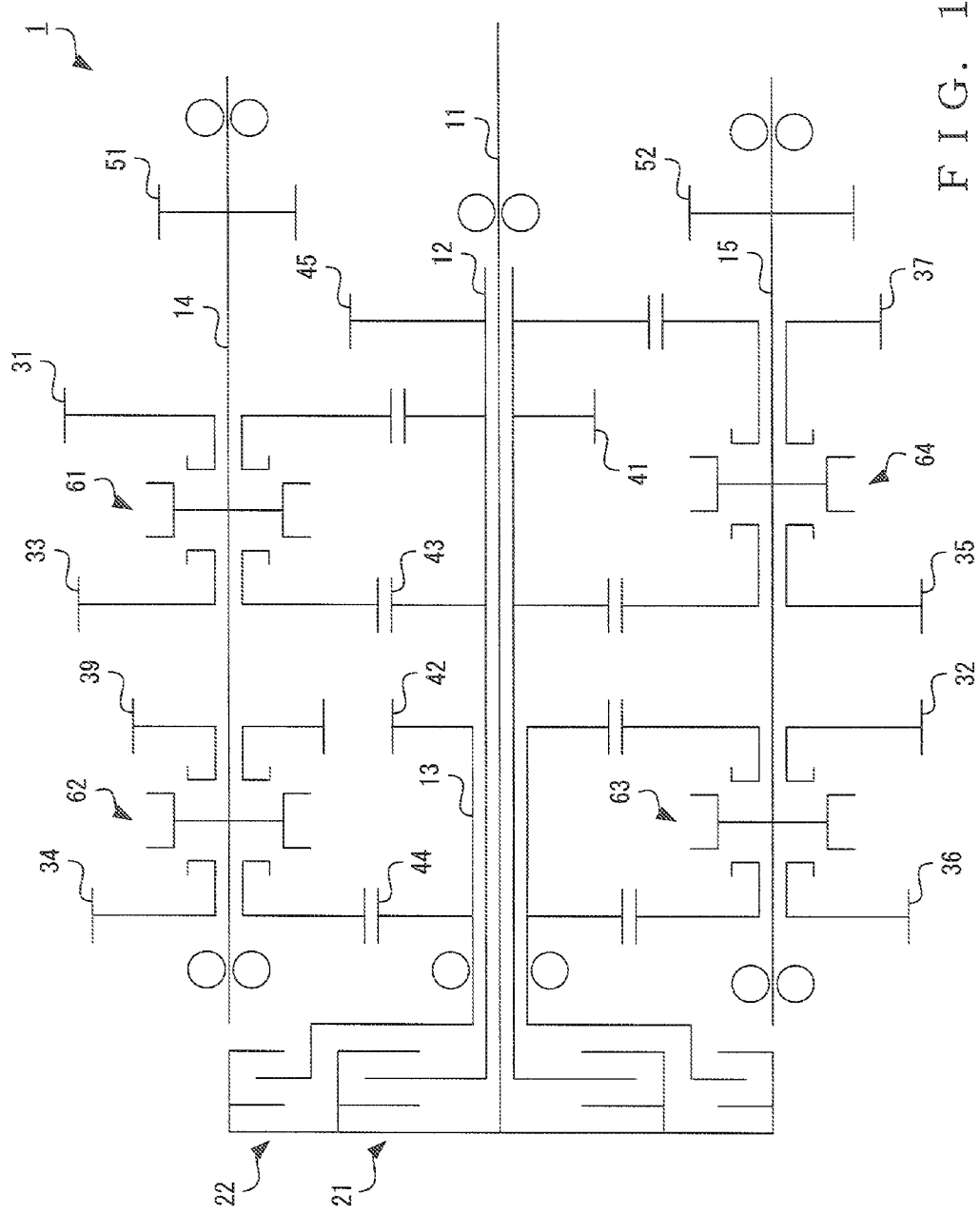
FIG. 1 is one example of a skeleton diagram of a twin clutch transmission to which a hydraulic control device for an automatic transmission according to the present invention is applied.

A configuration of an automatic transmission to which a hydraulic control device for an automatic transmission according to one embodiment of the present invention is applied will first be described. FIG. 1 is one example of a skeleton diagram of a twin clutch transmission to which a hydraulic control device for an automatic transmission according to the present invention is applied. A twin clutch transmission 1 shown in FIG. 1 is an automatic transmission having seven forward gears and one reverse gear, and carries out a gear shifting control via a hydraulic control device (will be described later) on the basis of a control from an electronic control unit (ECU: Electronic Control Unit, which will be described later). In the present embodiment, a plurality of frictional engagement elements (clutches 21, 22, will be described later) are respectively provided so as to correspond to a plurality of driving force transmitting routes within the hydraulic control device, and the electronic control unit carries out a shift control by switching the plurality of frictional engagement elements (the clutches 21, 22) after carrying out selection of a gear to be selected next when to instruct gear shifting.

The twin clutch transmission 1 according to the present embodiment is a twin clutch automatic transmission with two drive shafts and two output shafts. The twin clutch transmission 1 includes: an input shaft 11; a hollow first drive shaft 12 arranged coaxially with the input shaft 11; a hollow second drive shaft 13 arranged coaxially with the input shaft 11 and the first drive shaft 12; a first output shaft 14 arranged parallel to the input shaft 11, the first and second drive shafts 12, 13; and a second output shaft 15 arranged parallel to the input shaft 11, the first and second drive shafts 12, 13 and the first output shaft 14.

The input shaft 11 is connected to a crank shaft of a driving source (that is, an engine, not shown in the drawings) via a torque converter, for example. In this regard, since presence or absence of the torque converter is not an essential part of the present invention, the twin clutch transmission 1 may be configured so that the input shaft 11 is directly connected to the crank shaft of the engine without provision of the torque converter.

The first drive shaft 12 is arranged around the input shaft 11 and coaxially with the input shaft 11. When a first clutch 21 engages, the first drive shaft 12 is selectively connected to the input shaft 11. Further, the second drive shaft 13 is arranged around the first drive shaft 12 and coaxially with the input shaft 11 and the first drive shaft 12. When a second clutch 22 engages, the second drive shaft 13 is selectively connected to the input shaft 11.

Each of the first clutch 21 and the second clutch 22 is a well-known wet type multiplate clutch, for example. However, each of these clutches 21, 22 may be a dry type multiplate clutch, which contributes to improvement of fuel economy of a vehicle.

A seventh drive gear 45, a first (LOW) drive gear 41 and a third-fifth drive gear 43 are fixed to the first drive shaft 12 in order from an input side (right side in FIG. 1). A second-reverse drive gear 42 and a fourth-sixth drive gear 44 are fixed to the second drive shaft 13 in order from the input side.

A first final drive gear 51 is fixed to the first output shaft 14 at the rightmost side in FIG. 1. Further, a first driven gear 31, a third driven gear 33, a reverse driven gear 39 and a fourth driven gear 34 are rotatably provided on the first output shaft 14 in order from the right side in FIG. 1. A first synchromesh mechanism (selector device) 61 is provided between the first driven gear 31 and the third driven gear 33, and a second synchromesh mechanism 62 is provided between the reverse driven gear 39 and the fourth driven gear 34.

When a coupling sleeve of the synchromesh mechanism 61 is caused to slide to the right in FIG. 1, the first driven gear 31 is selectively connected to the first output shaft 14. Similarly, when this coupling sleeve is caused to slide to the left, the third driven gear 33 is selectively connected to the first output shaft 14. Further, when a coupling sleeve of the second synchromesh mechanism 62 is caused to slide to the right in FIG. 1, the reverse driven gear 39 is selectively connected to the first output shaft 14. Similarly, when this coupling sleeve is caused to slide to the left, the fourth driven gear 34 is selectively connected to the first output shaft 14.

A second final drive gear 52 is fixed to the second output shaft 15. Further, a seventh driven gear 37, a fifth driven gear 35, a second driven gear 32 and a sixth driven gear 36 are rotatably provided in order from the right side in FIG. 1. A fourth synchromesh mechanism 64 is provided between the seventh driven gear 37 and the fifth driven gear 35, and a third synchromesh mechanism 63 is provided between the second driven gear 32 and the sixth driven gear 36.

When a coupling sleeve of the third synchromesh mechanism 63 is caused to slide to the right in FIG. 1, the second driven gear 32 is selectively connected to the second output shaft 15. Similarly, when this coupling sleeve is caused to slide to the left, the sixth driven gear 36 is selectively connected to the second output shaft 15. Further, when a coupling sleeve of the fourth synchromesh mechanism 64 is caused to slide to the right in FIG. 1, the seventh driven gear 37 is selectively connected to the second output shaft 15. Similarly, when this coupling sleeve is caused to slide to the left, the fifth driven gear 35 is selectively connected to the second output shaft 15.

The first driven gear 31 always engages with the first drive gear 41, and the third driven gear 33 and the fifth driven gear 35 always engage with the third-fifth drive gear 43. The second driven gear 32 always engages with the second-reverse drive gear 42. The fourth driven gear 34 and the sixth driven gear 36 always engage with the fourth-sixth drive gear 44. Further, the first final drive gear 51 and the second final drive gear 52 engage with a final driven gear (ring gear) of a differential mechanism (not shown in the drawings).

Figure 2:
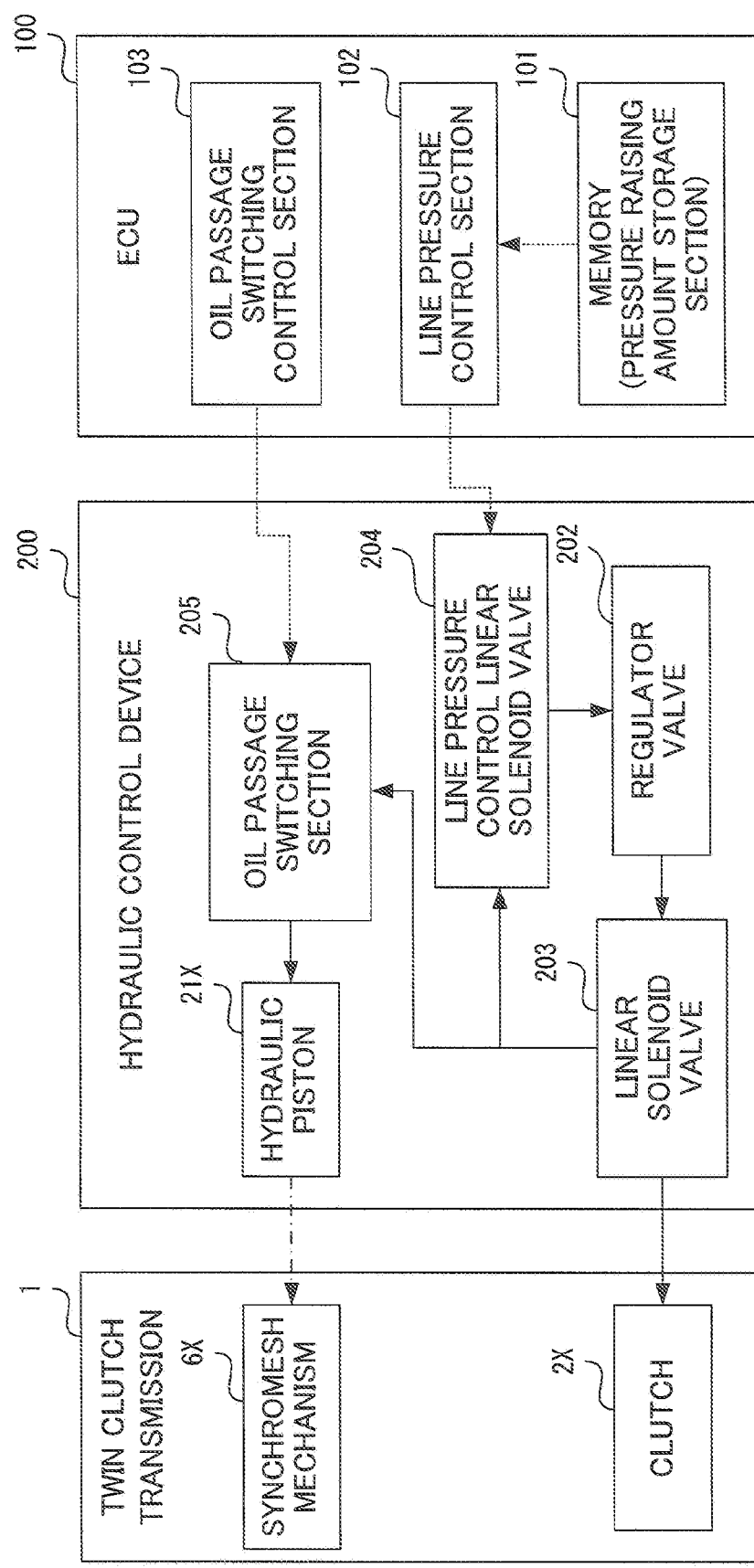
FIG. 2 is a functional block diagram of a hydraulic control device and an electronic control unit for controlling the twin clutch transmission shown in FIG. 1.

Next, a configuration of an electronic control unit (ECU) 100 and a hydraulic control device 200 that controls drive of the first and second clutches 21, 22 and drive of the first to fourth synchromesh mechanisms 61 to 64 in the twin clutch transmission 1 according to the present embodiment will be described. FIG. 2 is a functional block diagram of the hydraulic control device 200 and the electronic control unit 100 for controlling the twin clutch transmission 1 shown in FIG. 1. In this regard, in FIG. 2, arrowed and dotted lines indicate electrical connection, arrowed and solid lines indicate connection by oil passages, and an arrowed and dashed-dotted line indicates mechanical connection.

As shown in FIG. 2, the electronic control unit 100 according to the present embodiment includes: a memory (pressure raising amount storage section) 101 for storing (memorizing) a pressure raising amount map (will be described later, see FIG. 6); a line pressure control section 102 for controlling switching of a line pressure PL regulated by a regulator valve 202 (will be described later) of the hydraulic control device 200; and an oil passage switching control section 103 for controlling oil passages to actuators (which is configured by a hydraulic piston (will be described later)) of the respective synchromesh mechanisms 6X (61 to 64).

Further, the hydraulic control device 200 according to the present embodiment includes: a regulator valve 202; a linear solenoid valve 203, a line pressure controlling linear solenoid valve 204; an oil passage switching section 205; and a hydraulic piston 21X that constitutes an actuator of each synchromesh mechanism 6X. In this regard, the synchromesh mechanism 6X indicates any one of the first to fourth synchromesh mechanisms 61 to 64 shown in FIG. 1. For that reason, the hydraulic pistons 21X may be provided for the same number as the first to fourth synchromesh mechanisms 61 to 64 (that is, four) or the same number as the driven gears 31 to 37, 39 corresponding to each of the gears (that is, eight). Alternatively, by providing a shift valve (not shown in the drawings) as a switching section on the way of the oil passage from the oil passage switching section 205 to the hydraulic piston 21X, the fewer number of hydraulic pistons 21X may be provided within the hydraulic control device 200. Further, FIG. 2 show only one linear solenoid valve 203. However, in the present embodiment, a plurality of linear solenoid valves may be provided so as to correspond to the first and second clutches 21, 22 or a hydraulic torque converter (not shown in the drawings).

The regulator valve 202 regulates the line pressure PL that becomes a base oil pressure for operating engagement of the first and second clutches 21, 22 from the hydraulic pressure supplied from an oil pump (hydraulic pressure supply source) 201 (will be described later, see FIG. 3). The linear solenoid valve 203 can arbitrarily regulate the line pressure PL regulated by the regulator valve 202 in accordance with a shift control. At switching between the first clutch 21 and the second clutch 22, by gradually increasing an engagement control hydraulic pressure to be supplied using the linear solenoid valve 203, it is possible to reduce a gear shifting shock of the twin clutch transmission 1.

The oil passage switching section 205 switches oil passages to which the control hydraulic pressure is supplied from the linear solenoid valve 203 by means of a control of the oil passage switching control section 103 of the electronic control unit 100 in order to switch gears among at least two gears including the gear to be selected. In this regard, the oil passage switching section 205 may be configured so as to include a shift valve and a solenoid valve, for example.

The line pressure control section 102 controls the line pressure controlling linear solenoid valve 204 in order to raise the line pressure PL regulated by the regulator valve 202 before switching from a gear currently set up to the gear to be selected. The control of the regulator valve 202 will be described later. In this regard, a line pressure raising section according to the present invention is configured by the line pressure control section 102 and the line pressure controlling linear solenoid valve 204.

Figure 6:
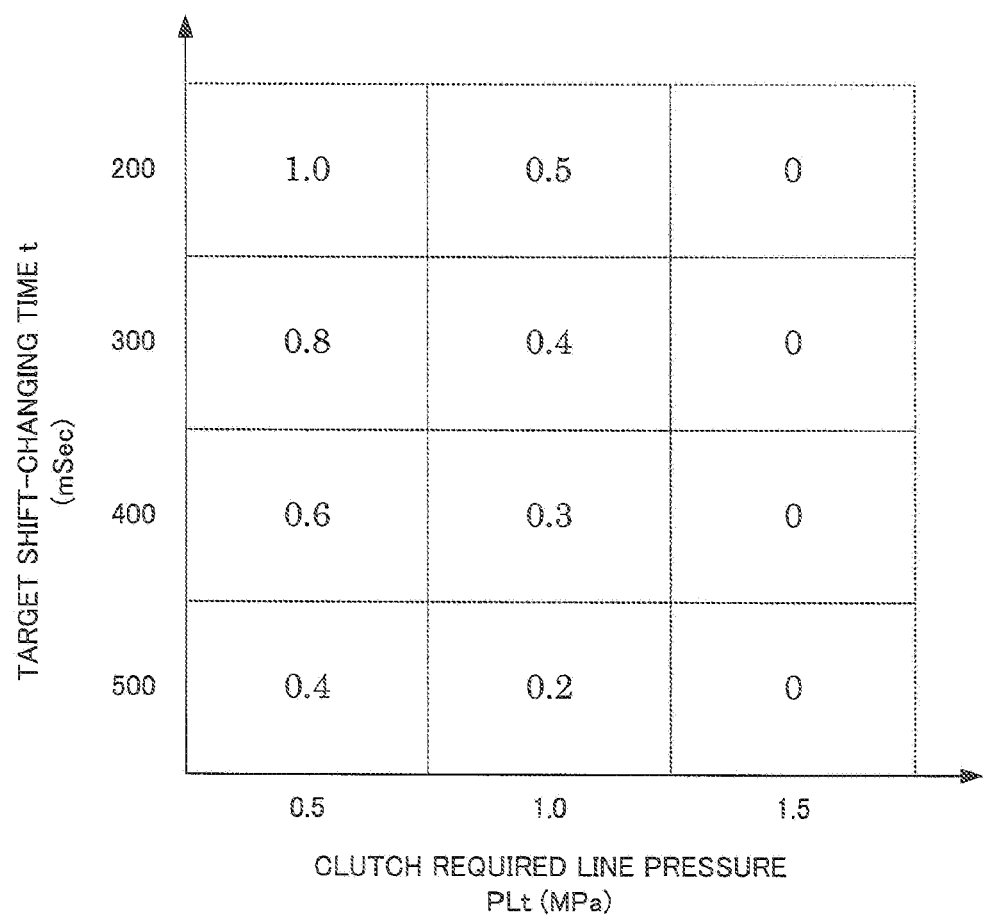
FIG. 6 is a pressure raising amount map showing a pressure raising amount with respect to a target shift-changing time and a clutch required line pressure in a pre-shift control.

In the memory 101, a pressure raising amount $\Delta PL$ of a pressure raising control for the line pressure PL is stored in accordance with a setup condition of a shift control. More specifically, as shown in FIG. 6, a pressure raising amount map based upon a time t required to switch into the gear to be selected (that is, a target shift-changing time) and a required line pressure PLt of the first or second clutch 21, 22 corresponding to the gear is stored in the memory 101. In this regard, the pressure raising amount map may be one based upon any one of the target shift-changing time t and the clutch required line pressure PLt. Further, this pressure raising amount map may be created on the basis of a relationship between a shift control condition obtained in advance by experiments or the like and a pressure raising amount.

The line pressure control section 102 determines a pressure raising amount ΔPL of the line pressure PL on the basis of the pressure raising amount map stored in the memory 101, and controls the line pressure controlling linear solenoid valve 204 so that the line pressure PL regulated by the regulator valve 202 is raised by this pressure raising amount ΔPL.

The electronic control unit 100 supplies a control signal to the linear solenoid valve 203, a shift valve (not shown in the drawings) and the like to control to turn them ON/OFF. In a static state of the twin clutch transmission 1 (that is, a state in which any gear is set up and the vehicle drives), the hydraulic control device 200 directly supplies the line pressure PL regulated by the regulator valve 202 (that is, the clutch required line pressure PLt) to an oil chamber (not shown in the drawings) of the first or second clutch 21, 22 that engages currently.

On the other hand, at a shift control of the twin clutch transmission 1, for example, at the shift control from a second gear to a third gear, in a state that the second clutch 22 engages, the line pressure control section 102 first controls the line pressure controlling linear solenoid valve 204 to carry out a control to raise the line pressure PL regulated by the regulator valve 202 by the pressure raising amount ΔPL shown in FIG. 6.

At this time, the hydraulic oil with the line pressure PL regulated by the regulator valve 202 is supplied to the oil chamber (not shown in the drawings) of the second clutch 22, and the hydraulic oil with the control pressure (for a piston control) regulated by the linear solenoid valve 203 is supplied to the hydraulic piston 21X via the linear solenoid valve 203 and the oil passage switching section 205. In this state, the oil passage switching control section 103 carries out a switching control of the oil passage switching section 205 so that the hydraulic oil of the control hydraulic pressure is supplied to the hydraulic piston 21X (that is, a hydraulic piston 213 (will be described later), see FIG. 3) corresponding to the third gear.

At the start of stroke of the hydraulic piston 21X corresponding to the third gear, the line pressure PL regulated within the line pressure circuit may somewhat vary. However, compared with the case where the line pressure PL is not raised as a conventional manner, decrease of the line pressure PL is suppressed sufficiently in the hydraulic control device 200 according to the present embodiment. Thus, in the hydraulic control device 200 according to the present embodiment, the line pressure PL is raised in advance by the pressure raising amount ΔPL at the pre-shift control before the shift control. Therefore, it is possible to effectively prevent the line pressure PL from decreasing in an early state of switching of gears in the twin clutch transmission 1.

Then, stroke of the hydraulic piston 21X corresponding to the third gear causes the coupling sleeve of the first synchromesh mechanism 61 to slide to the left in FIG. 1, and the third driven gear 33 is selectively connected to the first output shaft 14.

When the line pressure control section 102 determines the pressure raising amount ΔPL using the pressure raising amount map, the line pressure control section 102 determines that switching into the third gear is completed after the target shift-changing time set up by the electronic control unit 100 elapses. The line pressure control section 102 then controls the line pressure controlling linear solenoid valve 204 so that the line pressure PLt+ΔPL raised by the line pressure controlling linear solenoid valve 204 is set up to that before raising, that is, so that it is reduced to the static line pressure PLt. This makes it possible to effectively prevent the line pressure PL from decreasing in an early state of the shift control while minimizing the time in which the line pressure PL is raised to PLt+ΔPL.

The linear solenoid valve 203 then regulates pressure of the hydraulic oil so that the clutch control pressure becomes higher gradually, and this regulated clutch control pressure is applied to the oil chamber (not shown in the drawings) of the first clutch 21. On the other hand, the hydraulic control device 200 drains the hydraulic oil with the line pressure PL supplied to the oil chamber (not shown in the drawings) of the second clutch 22 by switching the oil passages by means of the oil passage switching section 205. Thus, the shift control from the second gear to the third gear is carried out.

Next, a configuration of a hydraulic pressure circuit (oil passages) of the hydraulic control device 200 according to the present embodiment will be described. FIG. 3 is a conceptual diagram illustrating a part of a hydraulic pressure circuit of the hydraulic control device 200 shown in FIG. 2. In FIG. 3, the first driven gear 31 and the third driven gear 33 for respectively setting up the first gear and the third gear, the first synchromesh mechanism 61 that causes them to selectively engage with the first output shaft 14, and the first clutch 21 that causes the first output shaft 14 to be connected to the input shaft 11 via the first drive shaft 12 are illustrated conceptionally. In this regard, in FIG. 3, a connection relationship between the first output shaft 14 and the first clutch 21 shown in FIG. 1 is to be changed because of a space.

Figure 3:
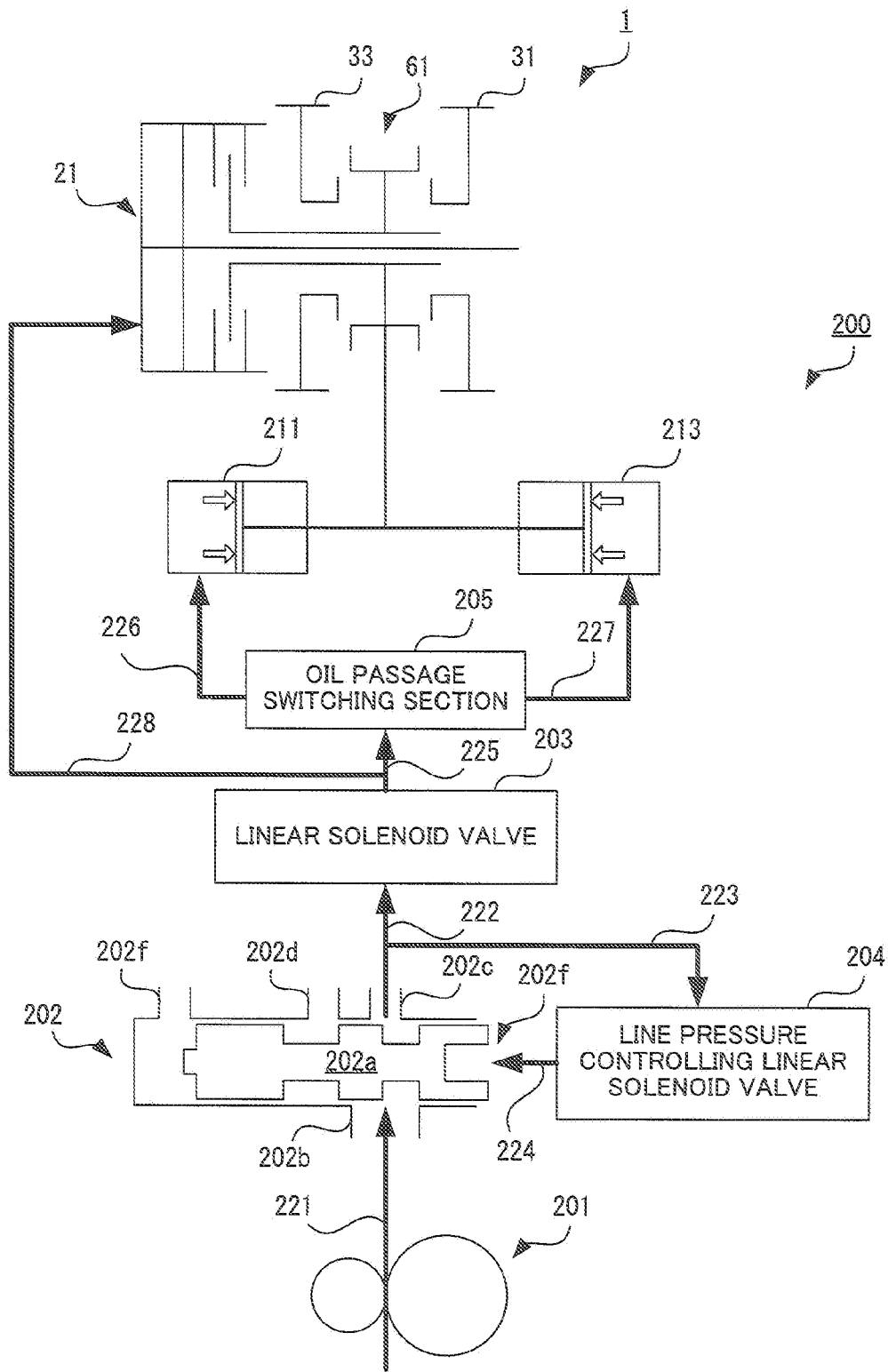
FIG. 3 is a conceptual diagram illustrating a part of a hydraulic pressure circuit of the hydraulic control device shown in FIG. 2.

As shown in FIG. 3, the hydraulic control device 200 includes, in addition to the configuration shown in FIG. 2, an oil pump (hydraulic pressure supply source) 201, a low gear hydraulic piston 211 and a third gear hydraulic piston 213 as the hydraulic pistons 21X. The oil pump 201 is driven by the driving source such as the engine (not shown in the drawings) to suction the hydraulic oil from an oil tank (not shown in the drawings) and to supply pump the suctioned hydraulic oil to an oil passage 221. The regulator valve 202 regulates the hydraulic oil supplied from the oil pump 201 to generate line pressure PL in oil passages 222, 223.

In FIG. 3, a part of the regulator valve 202 is omitted. The regulator valve 202 includes: a spool 202a that slides inside a housing; an input port 202b connected to the oil pump 201 via the oil passage 221; an output port 202c for the line pressure PL; a drain port 202d for draining a surplus hydraulic oil to the oil tank via an oil passage (not shown in the drawings); a feedback port 202e for feedbacking the hydraulic oil with the line pressure PL from a predetermined oil passage of the line pressure circuit, and a raising input port 202f to which the control hydraulic pressure is supplied from the line pressure controlling linear solenoid valve 204 via the oil passage 224.

The hydraulic oil discharged from the oil pump 201 is supplied to the oil passage 222 and the oil passage 223 via the oil passage 221, the input port 202b of the regulator valve 202, a spool channel of the spool 202a and the output port 202c. When the hydraulic pressure circuit of the hydraulic control device 200 becomes a static state, the regulator valve 202 supplies only the equivalent value of a leak rate of the hydraulic oil due to drain and the like of the respective valves of a latter part from the regulator valve 202 to the line pressure circuit via the output port 202c for the line pressure PL, and almost of the remaining hydraulic oil is returned to the oil tank via the drain port 202d.

The control hydraulic pressure regulated by the linear solenoid valve 203 is supplied to the oil passage switching section 205 via an oil passage 225. The oil passage switching section 205 switches between an oil passage 226 for supplying the control hydraulic pressure to the low gear hydraulic piston 211 and an oil passage 227 for supplying the control hydraulic pressure to the third gear hydraulic piston 213. Further, when to switch clutches at a shift control, the control hydraulic pressure regulated by the linear solenoid valve 203 is supplied to the oil chamber of the first clutch 21 or the oil chamber of the second clutch 22 via an oil passage 228 and the like.

The oil passage switching section 205 switches a supply oil passage between the oil passage 226 and the oil passage 227 by the control of the oil passage switching control section 103 in the electronic control unit 100. When the oil passage switching section 205 switches the oil passage so as to supply the hydraulic oil to the oil passage 226, the hydraulic oil with the control hydraulic pressure is supplied to a cylinder of the low gear hydraulic piston 211, and the actuator of the first synchromesh mechanism 61 causes the coupling sleeve of the first synchromesh mechanism 61 to slide to the right. Thus, the first driven gear 31 is connected to the first output shaft 14. On the other hand, when the oil passage switching section 205 switches the oil passage so as to supply the hydraulic oil to the oil passage 227, the hydraulic oil with the control hydraulic pressure is supplied to a cylinder of the third gear hydraulic piston 213, and the actuator of the first synchromesh mechanism 61 causes the coupling sleeve of the first synchromesh mechanism 61 to slide to the left. Thus, the third driven gear 33 is connected to the first output shaft 14. Then, by switching from the second clutch 22 to the first clutch 21 by the control of the electronic control unit 100, the third gear is set up in the twin clutch transmission 1.

Even in the case other than the shift control from the second gear to the third gear, the electronic control unit 100 and the hydraulic control device 200 carry out the similar control. However, since it is not an essential portion of the present invention, detailed illustration of a hydraulic circuit diagram is omitted and explanation thereof is omitted.

Figure 4:
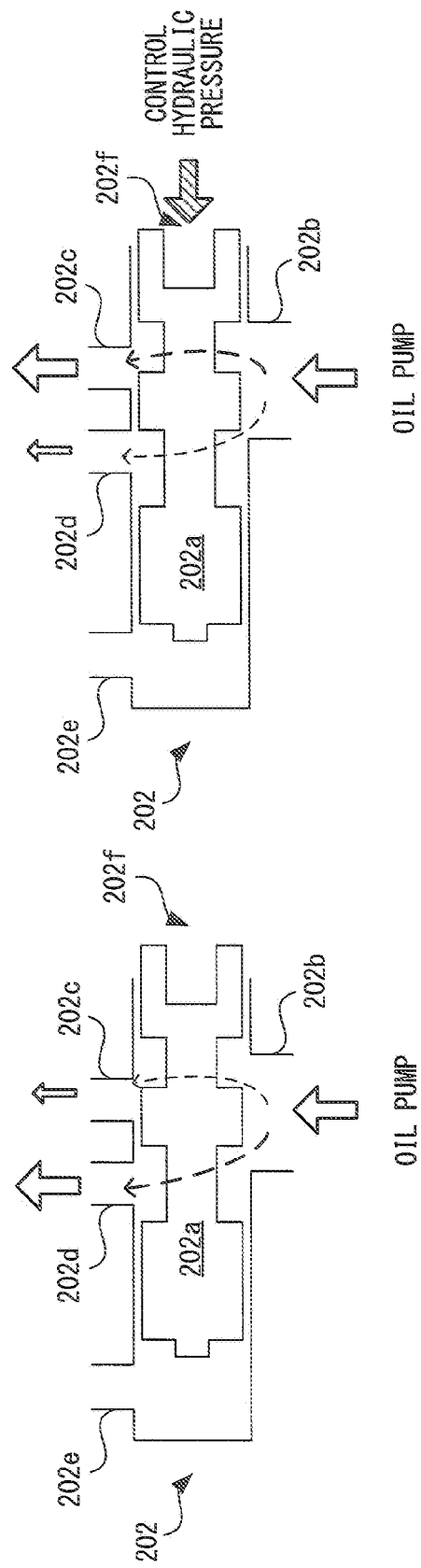
FIG. 4 is a conceptual diagram illustrating a static state and a raising state of a regulator valve shown in FIG. 3.

Next, the case where the line pressure PL regulated by the regulator valve 202 shown in FIG. 3 is raised will be described. FIG. 4 is a conceptual diagram illustrating a static state (FIG. 4A) and a raising state (FIG. 4B) of the regulator valve 202 shown in FIG. 3.

When the line pressure PL is established in the line pressure circuit, the line pressure PL is applied to the feedback port 202e, and the spool 202a is pressed to the right against a biasing force of a spring (not shown in the drawings) in the regulator valve 202. Thus, as shown in FIG. 4A, the regulator valve 202 becomes a static state, and an opening of the output port 202c for the line pressure PL is partially closed by means of the spool 202a. At this time, the hydraulic oil supplied from the oil pump 201 is mostly discharged from the drain port 202d, and only the equivalent value of the hydraulic oil of the leak rate as described above is discharged from the output port 202c for the line pressure PL.

At the pre-shift control of the shift control, the control hydraulic pressure corresponding to the pressure raising amount ΔPL is supplied to the raising input port 202f from the line pressure controlling linear solenoid valve 204 via the oil passage 224. Thus, as shown in FIG. 4B, the spool 202a of the regulator valve 202 is pressed to the left, and the opening of the output port 202c for the line pressure PL becomes larger compared with the static state. At this time, the line pressure PL regulated by the regulator valve 202 is raised up to a pressure obtained as a sum of a target line pressure PLt and the pressure raising amount ΔPL, and the hydraulic oil supplied from the oil pump 201 is mostly discharged from the output port 202c for the line pressure PL.

Thus, at the shift control, the line pressure control section 102 of the electronic control unit 100 raises the line pressure PL on the basis of a shift control condition and a pressure raising amount map (see FIG. 6). This makes it possible to appropriately set up a pressure raising amount ΔPL of the line pressure PL. Therefore, it is possible to effectively prevent the line pressure PL from decreasing at the pre-shift control of the shift control.

Figure 5:
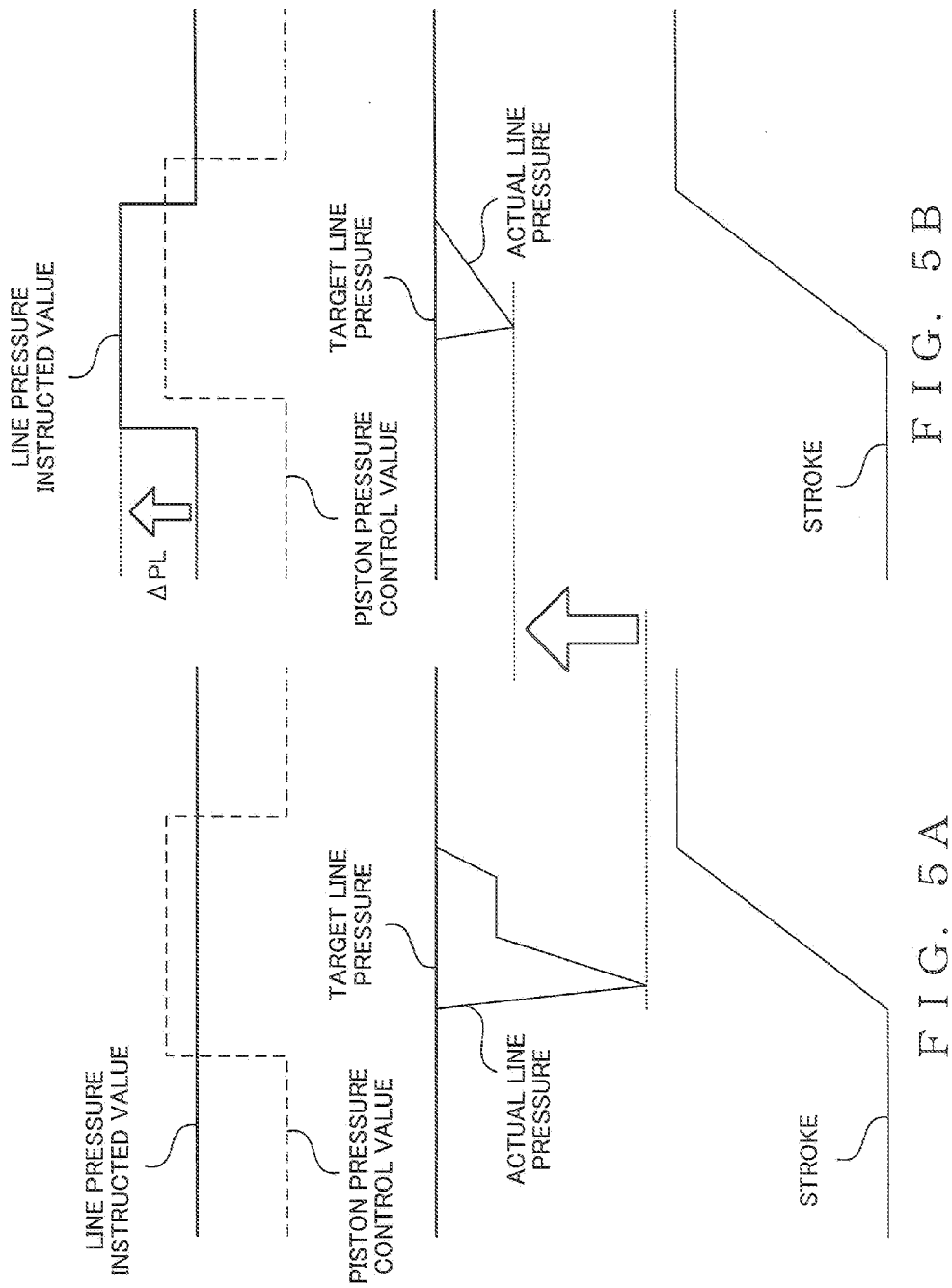
FIG. 5 is a timing chart of the line pressure and an operation of the regulator valve in a conventional method and a method of the present invention.

Next, an operation of the regulator valve 202 in each of the conventional method and a method according to the present invention will be described. FIG. 5 is a timing chart of the line pressure PL and an operation of the regulator valve 202 in a conventional method and a method of the present invention. FIG. 5A shows the conventional method, while FIG. 5B shows the method according to the present invention.

In the conventional method, a line pressure instructed value inputted from the electronic control unit 100 also becomes constant at the shift control. At this state, when an instruction to raise a piston pressure control value with respect to a predetermined hydraulic piston is inputted to the hydraulic control device 200 from the electronic control unit 100, the oil passage switching section 205 switches the oil passage into the oil passage to supply the hydraulic oil to a cylinder of a predetermined hydraulic piston from the oil passage currently set up. When the inside of the cylinder of this hydraulic piston is fulfilled with the hydraulic oil, the line pressure PL causes a piston ring to start to stroke.

At this time, the hydraulic oil supplied to the line pressure circuit from the output port 202c of the regulator valve 202 is the equivalent value of a leak rate as described above. For this reason, consumption of the hydraulic pressure and the oil quantity is increased due to start of the stroke of the piston ring. This causes the hydraulic oil within the line pressure circuit to become insufficient, and causes the line pressure (an actual line pressure) PL within the line pressure circuit to be reduced rapidly. Since the line pressure PL applied to the feedback port 202e also decreases at this time, the biasing force of the spring of the regulator valve 202 causes the spool 202a to slide to the left in FIG. 4, and the opening of the output port 202c is widened. For that reason, in the case where the actual line pressure raises gradually to reach the target line pressure and the stroke of the piston ring of the hydraulic piston is completed, the inside of the line pressure circuit becomes a static state again.

On the other hand, in the method according to the present invention, the line pressure control section 102 of the electronic control unit 100 controls the line pressure controlling linear solenoid valve 204 at the pre-shift control of the shift control, the line pressure instructed value is raised by the pressure raising amount ΔPL. Thus, the control hydraulic pressure is supplied to the raising input port 202f via the oil passage 224 by means of the line pressure controlling linear solenoid valve 204, the line pressure PL regulated by the regulator valve 202 is set up to the clutch required line pressure PLt+the pressure raising amount ΔPL.

The oil passage switching control section 103 then outputs an instruction to raise the piston pressure control value for a predetermined hydraulic piston to the hydraulic control device 200, and causes the oil passage switching section 205 to carry out switching into an oil passage corresponding to the predetermined hydraulic piston. When the inside of the cylinder of this hydraulic piston is fulfilled with the hydraulic oil, the raised line pressure PLt+ΔPL causes the piston ring to start to stroke.

Since the line pressure PL is raised at this time, the hydraulic oil supplied from the output port 202c of the regulator valve 202 to the line pressure circuit is increased. Therefore, even though the consumption of the hydraulic pressure and the oil quantity is increased by means of the stroke of the piston ring at this state, the actual line pressure within the line pressure circuit is suppressed to some decrease. Then, by reaching the target line pressure and completing the stroke of the piston ring of the hydraulic piston, the inside of the line pressure circuit becomes the static state again.

Thus, according to the method of the present invention, it is controlled so that the line pressure instructed value is raised before the hydraulic piston starts to stroke and the oil passage 222 of the output port 202c of the regulator valve 202 is opened sufficiently. This makes it possible to prepare consumption of the hydraulic pressure and the oil quantity immediately after the hydraulic piston starts to stroke, and it is possible to suppress rapid decrease of the hydraulic pressure (the actual line pressure) within the line pressure circuit.

Here, the pressure raising amount map will be explained briefly. FIG. 6 is a pressure raising amount map showing a pressure raising amount ΔPL with respect to the target shift-changing time t and the clutch required line pressure PLt in the pre-shift control. It is thought that, in the case where the clutch required line pressure PLt of the first or second clutch 21, 22 that currently engages is sufficiently high, responsiveness of the line pressure circuit is high. For that reason, in the pressure raising amount map, as shown in FIG. 6, in such a case, the pressure raising amount ΔPL controlled by the line pressure control section 102 may be set up to zero or an extremely low pressure.

On the other hand, the pressure raising amount map may be set up so that the pressure raising amount ΔPL controlled by the line pressure control section 102 becomes higher as this clutch required line pressure PLt becomes lower and the time required for the shift control of the twin clutch transmission 1, that is, the target shift-changing time t becomes shorter. By using the line pressure controlling linear solenoid valve 204 in this manner, it is possible to linearly change the pressure raising amount ΔPL of the line pressure PL (pressure raising control amount). Therefore, by controlling the twin clutch transmission 1, which carries out the shift control, in accordance with a driving state of the vehicle, it is possible to appropriately raise the line pressure PL applied to the first and second clutches 21, 22 at the pre-shift control of the shift control.

In this regard, the values of the pressure raising amount ΔPL with respect to the clutch required line pressure PLt and the target shift-changing time t as shown in FIG. 6 are illustrated in order to explain that the pressure raising amount ΔPL is to be changed in accordance with the terms and conditions, and they are not limited to their numerical values.

Figure 7:
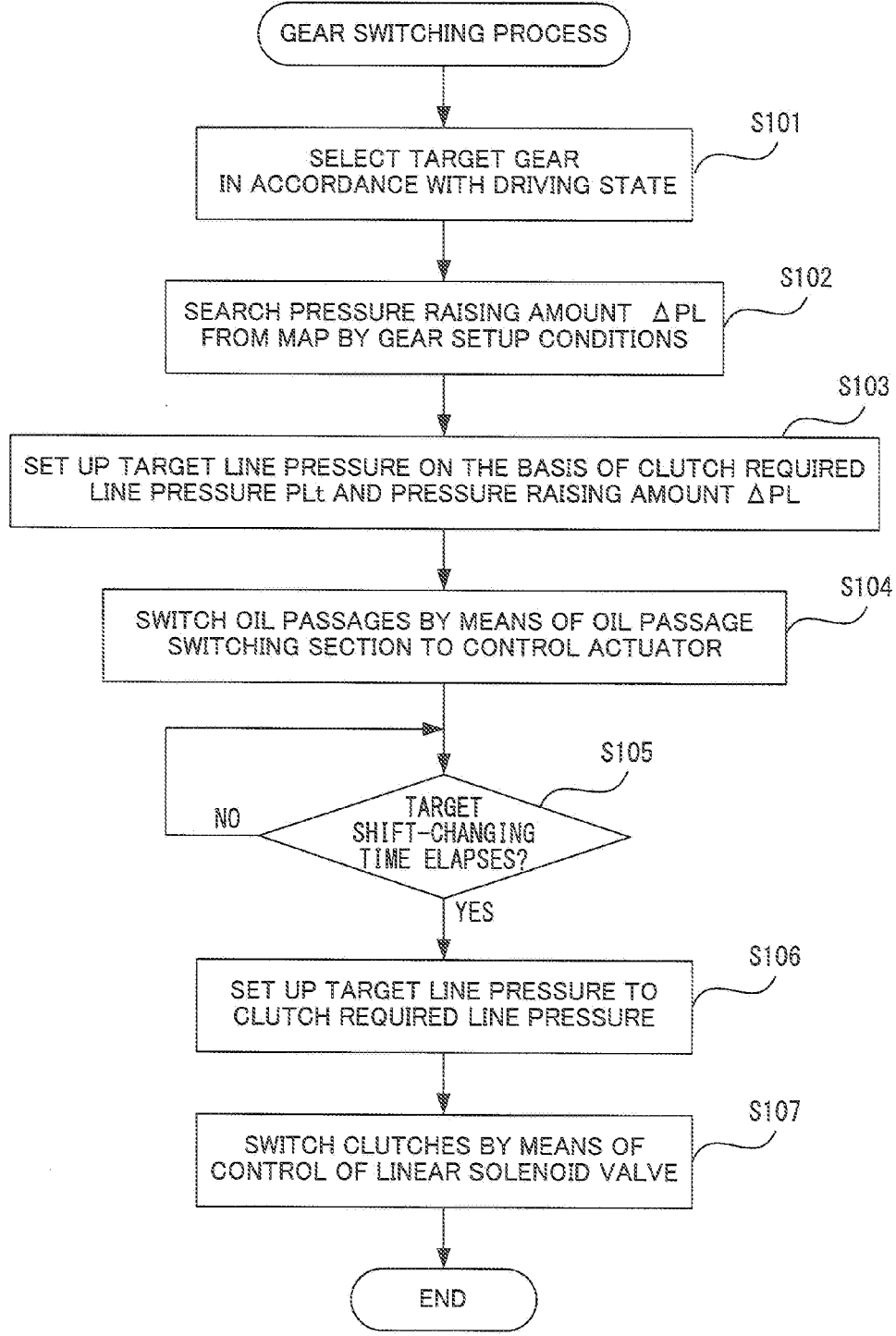
FIG. 7 is a flowchart showing a gear switching process carried out by the electronic control unit and the hydraulic control device according to the present embodiment.

Next, an operation of the electronic control unit 100 and the hydraulic control device 200 according to the present embodiment at the shift control of the twin clutch transmission 1 will be described. FIG. 7 is a flowchart showing a gear switching process carried out by the electronic control unit 100 and the hydraulic control device 200 according to the present embodiment. In this regard, the electronic control unit 100 controls an operation of the whole twin clutch transmission 1.

In the gear switching process according to the present embodiment, the electronic control unit 100 selects a target gear to be set up from a gear currently selected during driving in accordance with a driving state of a vehicle, that is, on the basis of detected data of a group of sensors (not shown in the drawings) for detecting various kinds of data during driving of the vehicle (Step S101).

Subsequently, the line pressure control section 102 of the electronic control unit 100 searches the pressure raising amount map stored in the memory 101 on the basis of gear setup conditions such as the current gear, the target gear, the target shift-changing time t, the clutch required line pressure PLt and the like, and determines a pressure raising amount ΔPL of the line pressure PL to be set up by the line pressure controlling linear solenoid valve 204 (Step S102).

Subsequently, the electronic control unit 100 sets up a target line pressure on the basis of the clutch required line pressure PLt and the pressure raising amount ΔPL (Step S103). Namely, the electronic control unit 100 sets up, as target line pressure, the value PLt+ΔPL obtained by adding the pressure raising amount ΔPL into the clutch required line pressure PLt, and controls the hydraulic control device 200 so that the line pressure PL regulated by the regulator valve 202 becomes the target line pressure PLt+ΔPL. Here, the line pressure control section 102 drives (ON) the line pressure controlling linear solenoid valve 204, and controls to open the output port 202c of the regulator valve 202 as described above. Thus, the line pressure is regulated the target line pressure PLt+ΔPL via the regulator valve 202.

Subsequently, the oil passage switching control section 103 drives the oil passage switching section 205 of the hydraulic control device 200 to switch an oil passage to which the line pressure PL is to be applied into an oil passage corresponding to the target gear, and causes the piston ring of the corresponding hydraulic piston 21X to slide so as to be pressed. Thus, the actuator of the synchromesh mechanism 6X is controlled to cause the coupling sleeve of this synchromesh mechanism 6X to slide toward the driven gear side corresponding to the target gear (Step S104).

Here, the line pressure control section 102 determines whether the target shift-changing time t set up at Step S102 elapses from start of the shift control (Step S105). In the case where it is determined that the target shift-changing time t does not elapse, the line pressure control section 102 waits at a current control state (a raising state of the line pressure PL) until the target shift-changing time t elapses.

On the other hand, in the case where it is determined that the target shift-changing time t elapsed, it is thought that the coupling sleeve of the synchromesh mechanism 6X has already slid. For this reason, the electronic control unit 100 sets up the target line pressure to the clutch required line pressure PLt (Step S106). Here, the line pressure control section 102 turns the line pressure controlling linear solenoid valve 204 OFF, and the output port 202c of the regulator valve 202 is partially closed. Thus, the hydraulic control device 200 regulates the hydraulic oil that is to be supplied to the hydraulic piston 21X via the regulator valve 202 to a target line pressure PLt.

Finally, the electronic control unit 100 controls the linear solenoid valve 203 corresponding to the clutch 2X caused to engage to switch (or shift) the clutches 2X (Step S107), and terminates this gear switching process.

In this regard, the present embodiment has been explained so that each of the linear solenoid valve 203 and the line pressure controlling linear solenoid valve 204 of the hydraulic control device 200 is a linear solenoid valve of a normal close type (a type in which it becomes a closing state when supplying no current). However, in the present invention, these linear solenoid valves 203, 204 are not limited to a normal close type. In this regard, in the case where a linear solenoid valve of a normal open type is used as each of the linear solenoid valves 203, 204, ON/OFF driving may be controlled so as to be inverted in the explanation as described above.

As explained above, according to the hydraulic control device for the automatic transmission of the present invention, the first and second clutches 21, 22 are respectively provided on the plurality of driving force transmitting routes (in the present embodiment, two systems), the electronic control unit 100 and the hydraulic control device 200 of the twin clutch transmission 1, which carries out the shift control by switching (shifting) of the first and second clutches 21, 22 after selection of the gear to be selected next is carried out when to instruct the gear shifting command, includes: the regulator valve 202 for regulating the line pressure PL, which becomes the base oil pressure for operating the first and second clutches 21, 22, from the hydraulic pressure applied from the oil pump 201; the linear solenoid valve 203 for regulating the line pressure PL regulated by the regulator valve 202 to the control hydraulic pressure in accordance with the shift control; the oil passage switching section 205 and the oil passage switching control section 103 for switching the oil passages 226, 227 to which the control hydraulic pressure is applied from the linear solenoid valve 203 in order to switch gears among at least two gears including the gear to be selected; and the line pressure control section 102 and the line pressure controlling linear solenoid valve 204 for raising the line pressure PL regulated by the regulator valve 202 before switching into the gear to be selected. Thus, when the shift control to switch from the current gear to the gear to be selected is carried out by switching the first and second clutches 21, 22 in addition to switching of the oil passages 226, 227 by means of the oil passage switching section 205, it is possible to effectively prevent the line pressure PL from decreasing in an early state of switching of the gears (for example, at the start of stroke of the low gear or third gear hydraulic piston 211, 213) by raising the line pressure PL in advance at the pre-shift control by only the pressure raising amount $\Delta PL$.

In the hydraulic control device for the automatic transmission according to the present invention, the line pressure control section 102 may control the amount of outputted oil of the regulator valve 202 by applying the control hydraulic pressure to the regulator valve 202 for the line pressure controlling linear solenoid valve 204 in order to carry out the pressure raising control of the line pressure PL. Thus, by using the line pressure controlling linear solenoid valve 204 in order to control the regulator valve 202, it is possible to linearly change the pressure raising amount of the line pressure (the pressure raising control amount). Therefore, it is possible to appropriately raise the target line pressure PLt set up in accordance with a driving state of the vehicle at the pre-shift control.

In the hydraulic control device for the automatic transmission according to the present invention, it may be configured so as to further include the memory (pressure raising amount storage section) 101 for storing the pressure raising amount $\Delta PL$ of the pressure raising control of the line pressure PL in accordance with the setup condition of the shift control as the pressure raising amount map in which the pressure raising amount map is based upon at least one of the target shift-changing time t required to switch into the gear to be selected and the required line pressure PLt of the first or second clutch 21, 22 corresponding to the gear; and so that the line pressure control section 102 determines the pressure raising amount $\Delta PL$ of the line pressure PL on the basis of the pressure raising amount map stored in the memory 101. Thus, the pressure raising amount map indicating a relationship between the shift control condition obtained in advance by experiments or the like and the pressure raising amount $\Delta PL$ is stored in the memory 101, and the line pressure control section 102 raises the line pressure PL on the basis of the shift control condition and the pressure raising amount map at the shift control. Therefore, it is possible to set up the pressure raising amount $\Delta PL$ of the line pressure PL appropriately, and this makes it possible to effectively prevent the line pressure PL from decreasing at the pre-shift control of the shift control.

In the hydraulic control device for the automatic transmission according to the present invention, the line pressure control section 102 may reduce the raised line pressure PLt+$\Delta PL$ to the line pressure PLt before raising after the switching into the gear to be selected (that is, sliding of the coupling sleeve of the synchromesh mechanism 6X into the predetermined driven gear) is completed. Therefore, it is possible to effectively prevent the line pressure from decreasing in an early state of the shift control while minimizing the raising time of the line pressure PL.

As described above, although the embodiment of the hydraulic control device for the automatic transmission according to the present invention has been explained in detail on the basis of the appending drawings, the present invention is not limited to these configurations. Various modifications can be made in a scope of the technical idea described in the following claims, the specification described above and the appending drawings without departing from the spirit and scope of the present invention. In this regard, even any shape, structure or function that is not described directly in the specification and the drawings falls within the technical idea of the present invention so long as the function and the effect of the present invention are achieved. Namely, each component constituting the hydraulic control device 200 and the electronic control unit 100 of the twin clutch transmission 1 according to the embodiment described above can be replaced with any arbitrary component that can achieve the similar function to the corresponding component. Further, arbitrary components may be added thereto.

In this regard, although the twin clutch transmission 1 has been described as the automatic transmission to which the present invention is applied as an example in the embodiment described above, the present invention is not limited to such a transmission. So long as it is an automatic transmission for controlling a controlled object such as an actuator of a synchromesh mechanism (in the embodiment described above, the hydraulic piston) using the hydraulic pressure at the pre-shift control of the shift control, the present invention may be applied to any automatic transmission.

What is claimed is:

1. A hydraulic control device for an automatic transmission, a plurality of frictional engagement elements being respectively provided so as to correspond to a plurality of driving force transmitting routes in the hydraulic control device, the hydraulic control device comprising a shift control section that carries out a shift control by switching the plurality of frictional engagement elements after selection of a gear to be selected next when to instruct gear shifting, the hydraulic control device comprising:

a regulator valve adapted to regulate a line pressure from a hydraulic pressure applied from a hydraulic pressure supply source, the line pressure becoming a base oil pressure for operating the plurality of frictional engagement elements;

a linear solenoid valve adapted to regulate the line pressure regulated by the regulator valve to a control hydraulic pressure in response to the shift control;

an oil passage switching section adapted to switch oil passages to which the control hydraulic pressure is applied from the linear solenoid valve in order to switch gears among at least two gears including the gear to be selected; and a line pressure raising section adapted to raise the line pressure regulated by the regulator valve before switching into the gear to be selected, wherein the line pressure raising section is adapted to raise the line pressure based on at least one of a target shift-changing time and a required line pressure for the frictional engagement element corresponding to the gear.

2. The hydraulic control device for the transmission as claimed in claim 1, the line pressure raising section includes a line pressure controlling linear solenoid valve that controls an amount of outputted oil from the regulator valve in order to carry out a pressure raising control for the line pressure.

3. A hydraulic control device for an automatic transmission, a plurality of frictional engagement elements being respectively provided so as to correspond to a plurality of driving force transmitting routes in the hydraulic control device, the hydraulic control device comprising a shift control section that carries out a shift control by switching the plurality of frictional engagement elements after selection of a gear to be selected next when to instruct gear shifting, the hydraulic control device comprising:

a regulator valve adapted to regulate a line pressure from a hydraulic pressure applied from a hydraulic pressure supply source, the line pressure becoming a base oil pressure for operating the plurality of frictional engagement elements;

a linear solenoid valve adapted to regulate the line pressure regulated by the regulator valve to a control hydraulic pressure in response to the shift control;

an oil passage switching section adapted to switch oil passages to which the control hydraulic pressure is applied from the linear solenoid valve in order to switch gears among at least two gears including the gear to be selected;

a line pressure raising section adapted to raise the line pressure regulated by the regulator valve before switching into the gear to be selected; and a pressure raising amount storage section adapted to store a pressure raising amount of the pressure raising control for the line pressure in accordance with a setup condition of the shift control, wherein the pressure raising amount storage section stores therein a pressure raising amount map based upon at least one of a time required for switching into the gear to be selected and a required line pressure for the frictional engagement element corresponding to the gear, and the line pressure raising section determines the pressure raising amount of the line pressure on the basis of the pressure raising amount map stored in the pressure raising amount storage section.

4. The hydraulic control device for the transmission as claimed in claim 1 or 2, wherein the line pressure raising section reduces the raised line pressure to the line pressure before raising after the switching into the gear to be selected is completed.

5. A hydraulic control device for an automatic transmission, a plurality of frictional engagement elements being respectively provided so as to correspond to a plurality of driving force transmitting routes in the hydraulic control device, the hydraulic control device comprising a shift control section that carries out a shift control by switching the plurality of frictional engagement elements after selection of a gear to be selected next when to instruct gear shifting, the hydraulic control device comprising:

a regulator valve adapted to regulate a line pressure from a hydraulic pressure applied from a hydraulic pressure supply source, the line pressure becoming a base oil pressure for operating the plurality of frictional engagement elements;

a linear solenoid valve adapted to regulate the line pressure regulated by the regulator valve to a control hydraulic pressure in response to the shift control;

an oil passage switching section adapted to switch oil passages to which the control hydraulic pressure is applied from the linear solenoid valve in order to switch gears among at least two gears including the gear to be selected;

a line pressure raising section adapted to raise the line pressure regulated by the regulator valve before switching into the gear to be selected, the line pressure raising section including a line pressure controlling linear solenoid valve that controls an amount of outputted oil from the regulator valve in order to carry out a pressure raising control for the line pressure; and a pressure raising amount storage section adapted to store a pressure raising amount of the pressure raising control for the line pressure in accordance with a setup condition of the shift control, wherein the pressure raising amount storage section stores therein a pressure raising amount map based upon at least one of a time required for switching into the gear to be selected and a required line pressure for the frictional engagement element corresponding to the gear, and the line pressure raising section determines the pressure raising amount of the line pressure on the basis of the pressure raising amount map stored in the pressure raising amount storage section.

\* \* \* \* \*